(12) United States Patent
Seki et al.

(10) Patent No.: US 6,978,087 B2
(45) Date of Patent: Dec. 20, 2005

(54) CAMERA HAVING DISPLAY DEVICE

(75) Inventors: Reiji Seki, Tondabayashi (JP); Makoto Akesaka, Sakai (JP); Hiroaki Minami, Sakai (JP); Tatsuya Suzuki, Kawachinagano (JP); Reiko Yoshida, Sakai (JP); Masami Ohyama, Habikino (JP); Hirofusa Kondo, Ikeda (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/870,950

(22) Filed: Jun. 21, 2004

(65) Prior Publication Data

US 2004/0223067 A1    Nov. 11, 2004

Related U.S. Application Data

(62) Division of application No. 09/935,765, filed on Aug. 24, 2001, now Pat. No. 6,760,548.

(30) Foreign Application Priority Data

Aug. 24, 2000 (JP) .............................. 2000-253837

(51) Int. Cl.⁷ ............................................ G03B 17/18
(52) U.S. Cl. ........................ 396/50; 396/287; 396/296
(58) Field of Search ............................ 396/48, 50, 287, 396/296; 348/333.02

(56) References Cited

U.S. PATENT DOCUMENTS 4,492,450 A * 1/1985 Watanabe et al. ............. 396/48
5,136,327 A    8/1992 Ogawa
5,485,238 A    1/1996 Miura et al.
5,585,878 A    12/1996 Matsukawa
5,608,491 A    3/1997 Sasagaki et al.
5,640,627 A    6/1997 Nakano et al.
5,678,092 A    10/1997 Kim et al.
5,745,810 A    4/1998 Matsushima
6,016,407 A    1/2000 Tsukahara
6,072,960 A    6/2000 Goto et al.
6,128,446 A    10/2000 Schrock et al.
6,222,538 B1   4/2001 Anderson
6,341,201 B1   1/2002 Ishiguro et al.

FOREIGN PATENT DOCUMENTS

JP           9-105998        4/1997
JP           11-282074       10/1999

* cited by examiner

Primary Examiner—W. B. Perkey
(74) Attorney, Agent, or Firm—McDermott Will & Emery LLP

(57) ABSTRACT

A disclosed photographing apparatus has a LCD display, a select member, and a controller. The display displays information about a photographic condition, in arbitrary display form using a dot-matrix. The select member selects one display mode among a plurality of display modes. In each mode of the plurality of display modes, display forms are different to each other, standard information required for photographing is displayed common to every display mode, and at least one information inherent to each display mode is displayed. The controller controls the display to display the display mode selected by the selector, and at a time of starting the camera, to display a display mode which has been displayed when the camera was previously switched off.

13 Claims, 16 Drawing Sheets

Fig. 14

CAMERA HAVING DISPLAY DEVICE

This application is a divisional of application Ser. No. 09/935,765 filed Aug. 24, 2001, now U.S. Pat. No. 6,760,548.

This application is based upon application No. 2000-253837 filed in Japan, the contents of which are hereby incorporated by reference.

BACKGROUND OF THE INVENTION

1. Field of the Invention

The present invention relates to a camera which has a display device such as a liquid crystal display (LCD).

2. Description of the Related Art

Recently, with the development of electronic circuit technology, single-lens reflex cameras have more various functions. In order to assist users to set up various functional modes and to inform the currently set up mode, almost all cameras are equipped with a LCD device.

Almost all conventional LCD devices are of segment displaying type, and therefore, they need display segments exclusively used for each function. Since a display area is limited, the number of the segments arranged therein is also limited. Thus, the conventional LCD devices do not meet diversification of functions.

On the other hand, some conventional LCD display devices employ a dot-matrix type LCD which displays various letters in the same displaying area. But, they are not of full dot-matrix type. Therefore, flexibility of display thereof is not enough; in other words, freedom to displaying them is limited therewith.

Therefore, an object of the present invention is to provide an apparatus realizing a flexible display, of the various indications, which meets the diversification of camera functions, by employing a full dot-matrix display which displays the indications on its whole displaying surface, and which does not have segment displaying portion.

SUMMERY OF THE INVENTION

In order to achieve this and other objects of the present invention, according to an embodiment, there is provided a camera comprising: a display using a dot-matrix which displays information about a photographic condition in arbitrary display form, a selector which selects one of a plurality of display modes, display forms of which are different to each other, wherein standard information required for photographing is displayed as common information among the display modes, and wherein at least one piece of information inherent to each display mode is displayed, and a controller which controls the display to display the one selected by the selector, and at a time of switching on the camera, to display a display mode which has been displayed at a time of switching off the camera previously.

As another embodiment, there is provided a camera comprising: a display using a dot-matrix which displays information about a photographic object in arbitrary display form, a detector which divides a photographic object field into a plurality of photographic areas, and which detects information about the photographic object in each of the photographic areas, and a controller which controls the display to display in a divided form wherein configuration of each of the photographic areas thus divided are displayed, and the information about the photographic object detected in each of the photographic areas is displayed within the configuration associated.

As still another embodiment, there is provided a camera comprising: a display using a dot-matrix which displays information about photographic conditions in arbitrary display form, a detector which detects whether a camera body postures horizontally or vertically, an operation member which can be manually operated, and a controller which changes a direction, in which the information is displayed on the display, based on a posture of the camera body detected by the detector, at a time of operating the operation member.

BRIEF DESCRIPTION OF THE DRAWINGS

This and other objects and features of the present invention will become clear from the following description taken in conjunction with the preferred embodiments thereof with reference to the accompanying drawings.

FIG. 14 is an explanatory view showing display forms in various languages.

DETAILED DESCRIPTION OF THE PREFERRED EMBODIMENT

Figure 1:
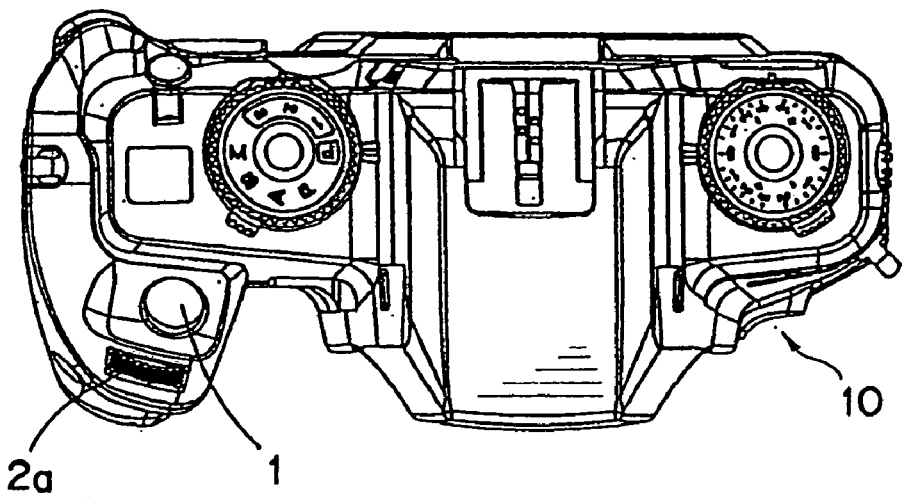
FIG. 1 is a plan view of a camera according to an embodiment of the present invention.

Before the description of the embodiments proceeds, it is to be noted that like or corresponding parts are designed by like reference numerals throughout the accompanying drawings.

Figure 2:
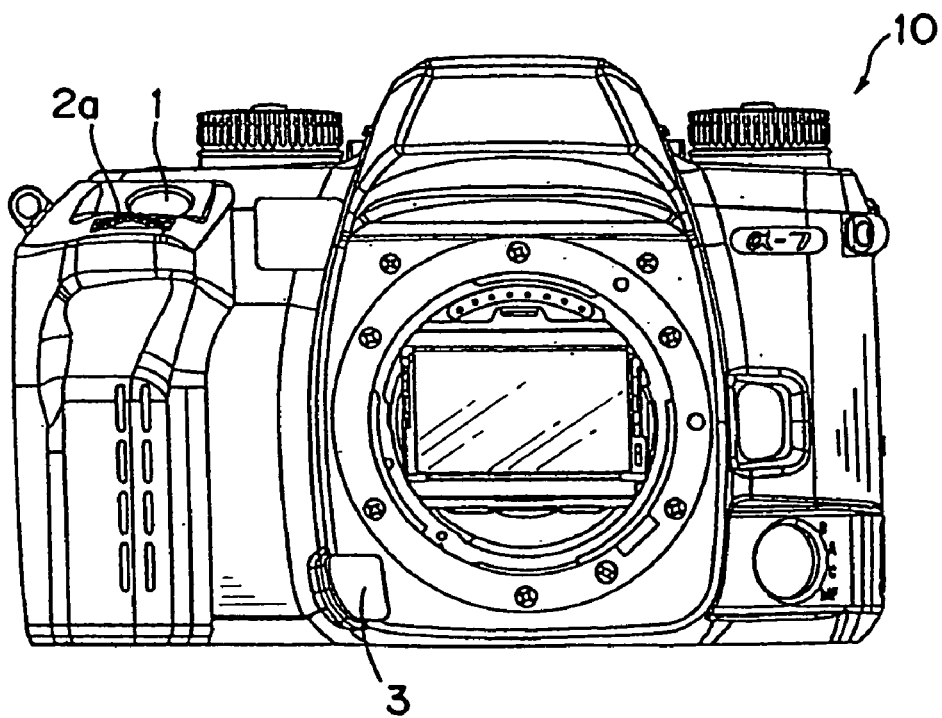
FIG. 2 is a front view of the camera in FIG. 1.
Figure 3:
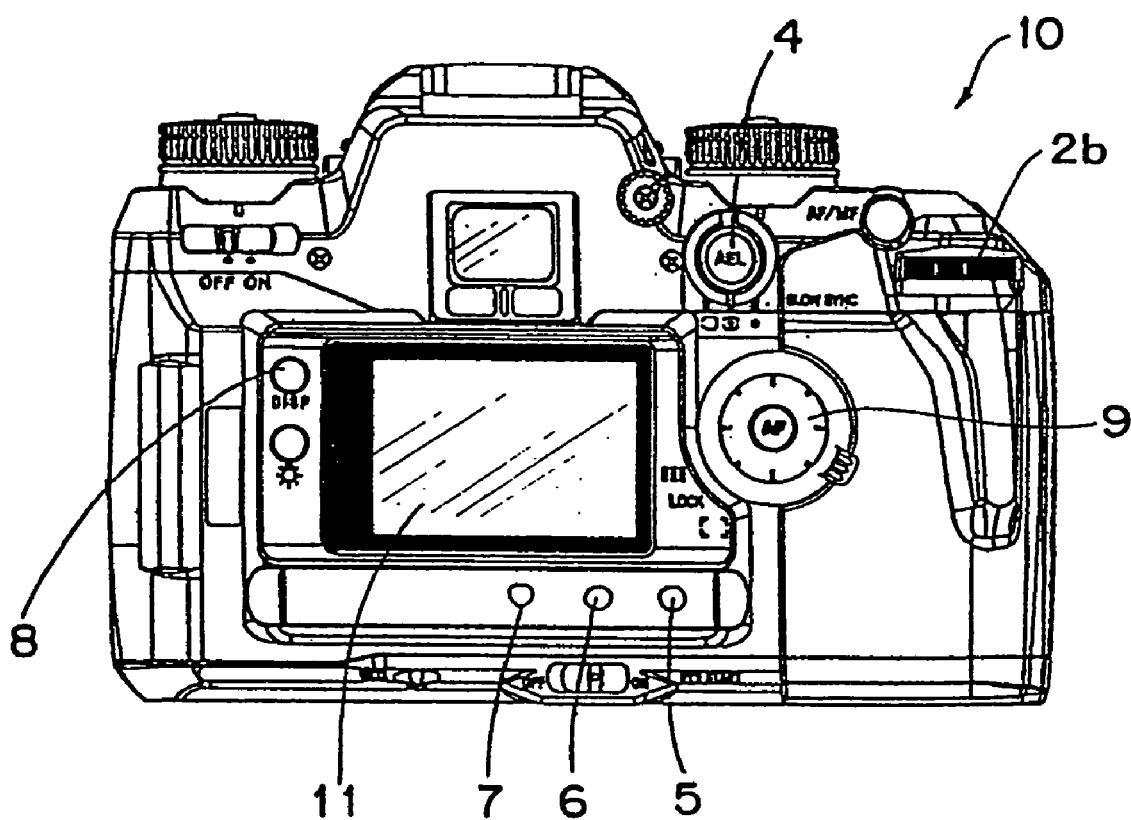
FIG. 3 is a rear view of the camera in FIG. 1.
Figure 4:
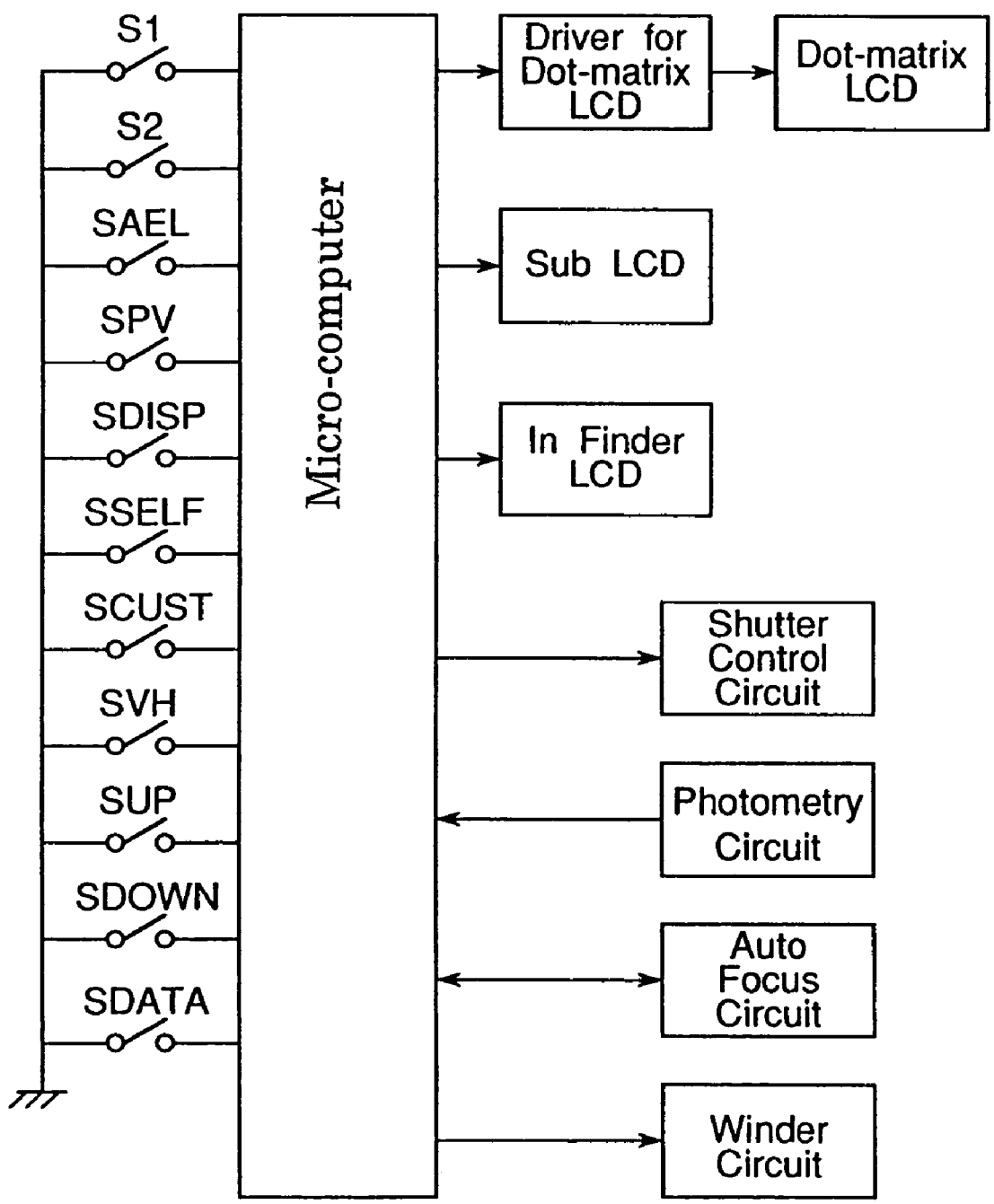
FIG. 4 is a block diagram explaining a control of the camera in FIG. 1.

An embodiment of the present invention is described below with reference to attached drawings. FIGS. 1 to 3 are, respectively, a plan view, a front view, and a bottom view of a camera 10 according to the embodiment of the present invention. In these views, there are shown an arrangement of a shutter release button 1, a front dial 2a, a rear dial 2b, preview button 3, an AE(auto exposure)-lock button 4, a self-timer button 5, a custom button 6, a data-memory button 7, a screen-switch button 8, a custom set-up member 9, and an LCD device 11. FIG. 4 is a block diagram explaining a control of the camera 10, with a microcomputer as a controller being at its center.

The camera 10 is equipped with a detector, by which a photographic object field is divided into a plurality of areas at each of which a metering serving for auto focusing, a light-metering for auto exposure (photometry), light adjusting for flashing, and so on, are performed (refer to FIG. 4). Information in each area detected by the detecting device (i.e. detector) is displayed on the LCD device 11, with the configuration or shape of the associated area (refer to FIG. 8).

Figure 5:
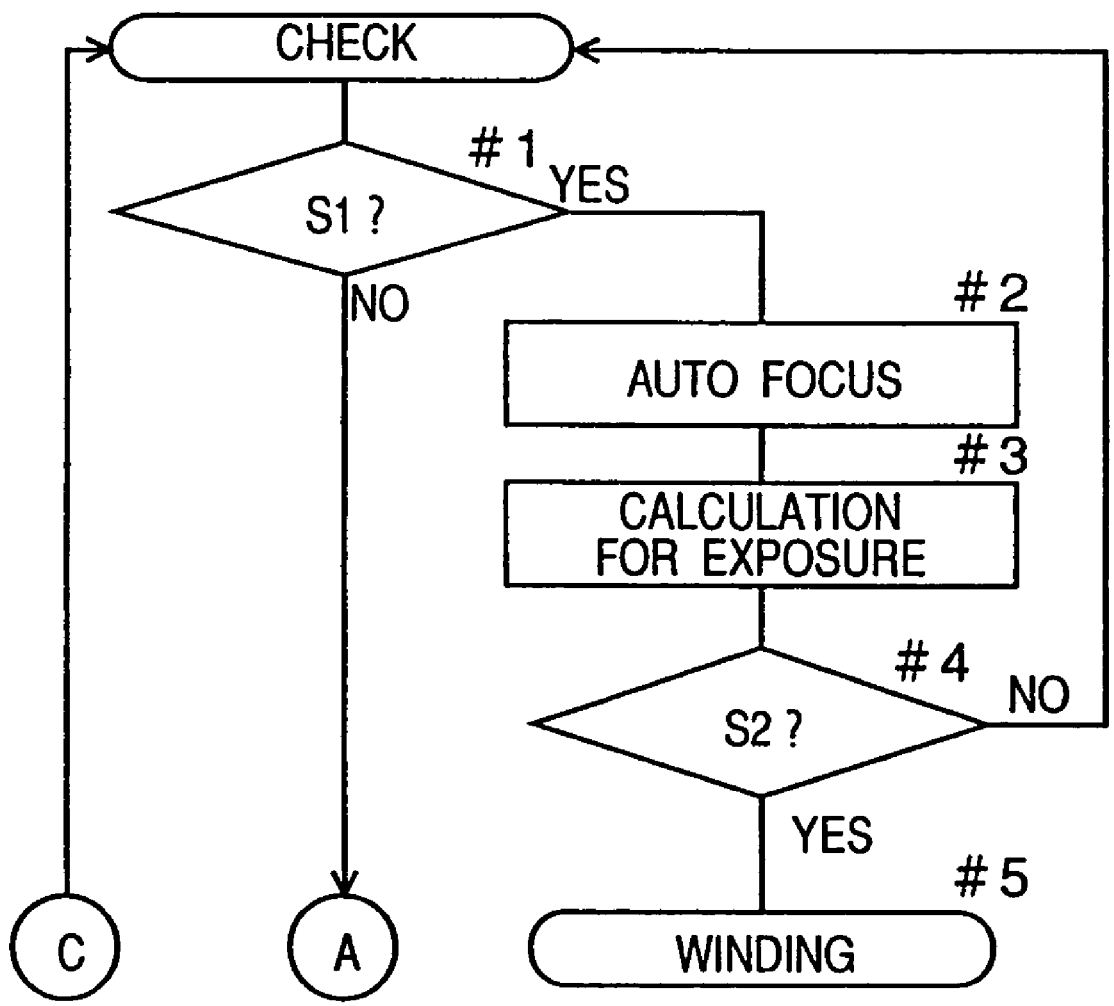
FIGS. 5 to 7 show a flow chart explaining the control of the camera in FIG. 1.
Figure 6:
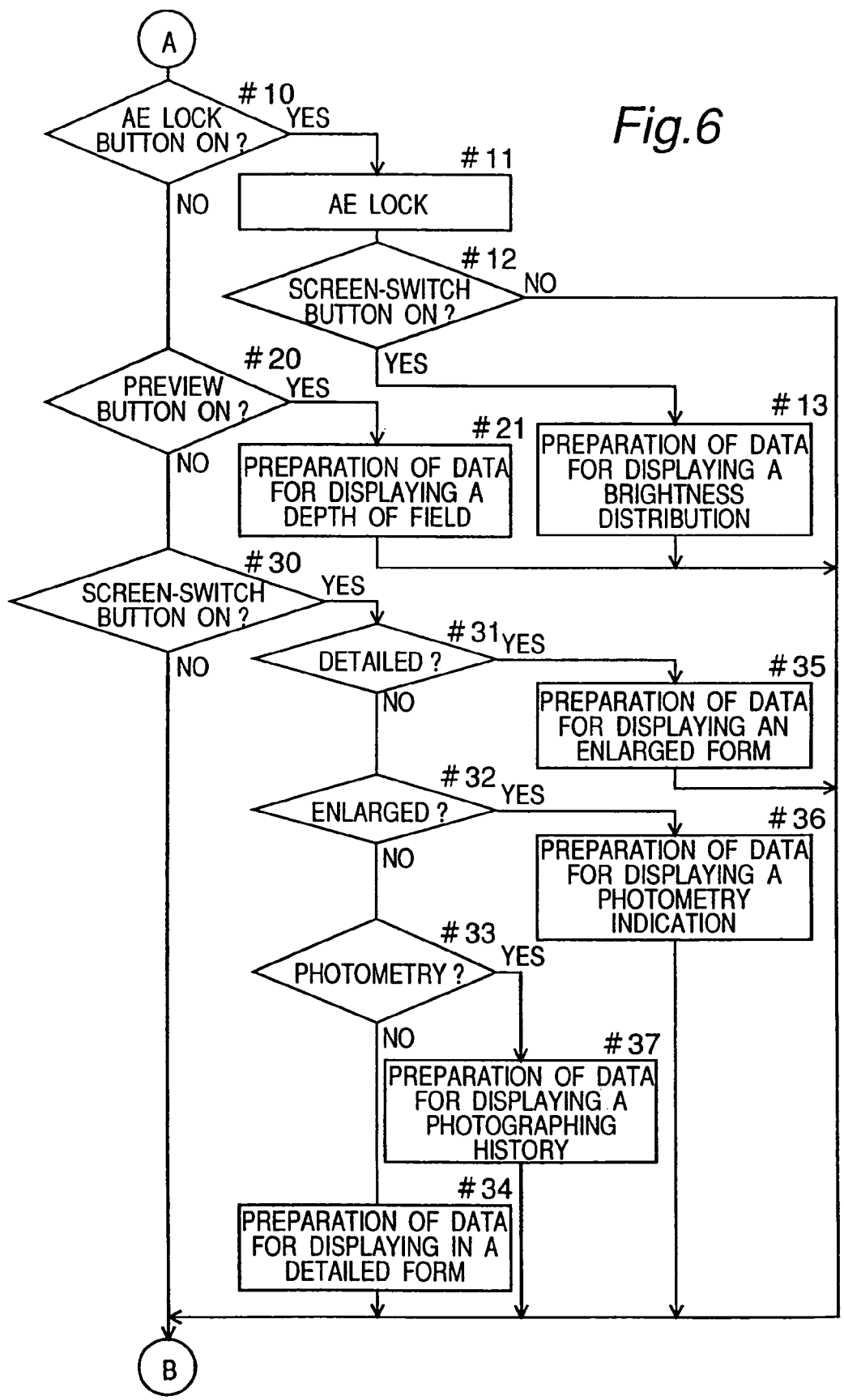
Figure 7:
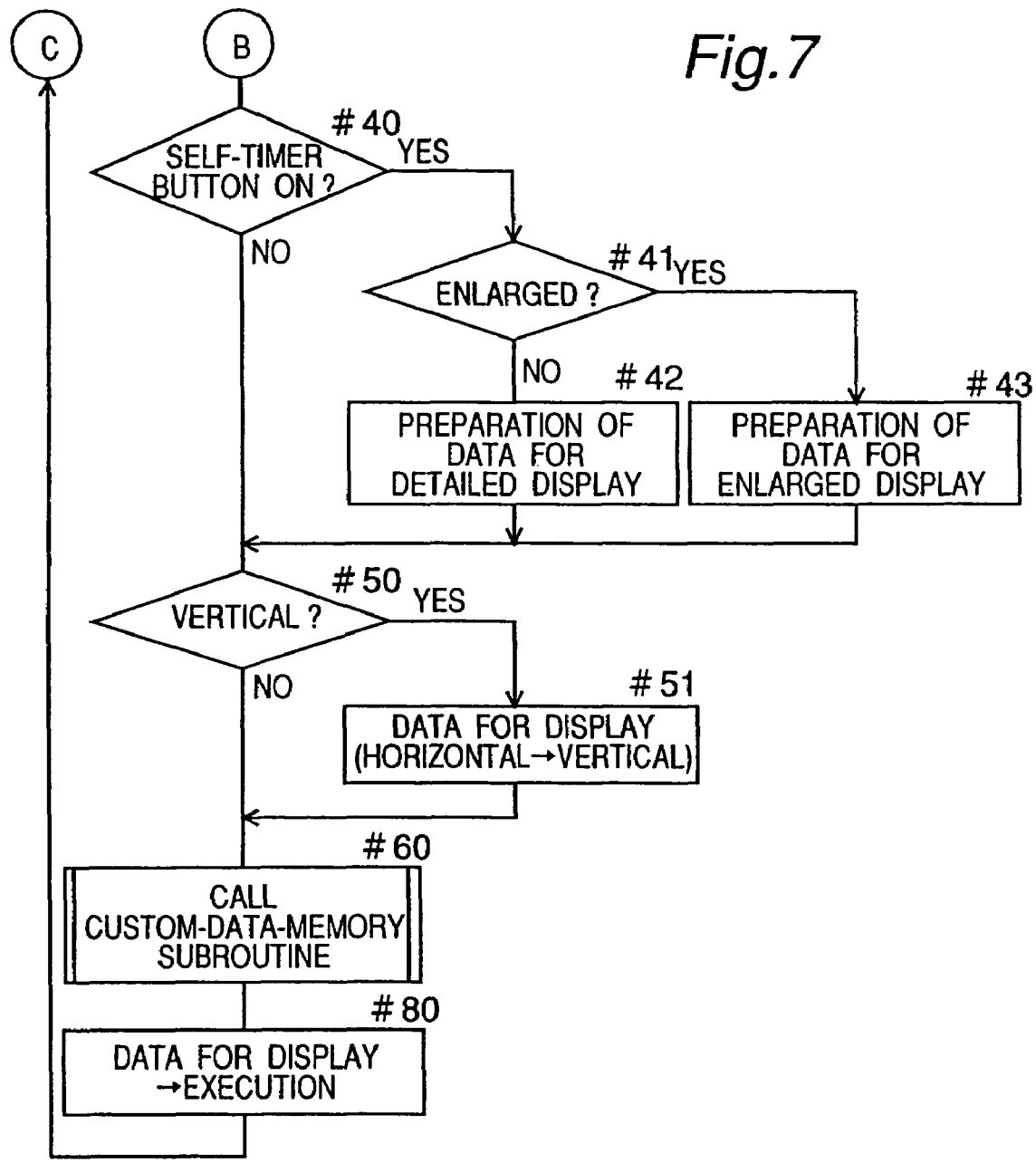

With reference to the flow charts in FIGS. 5 to 7, a control of the camera 10 will be explained. When the shutter release button 1 is half-pressed and the switch 'S1' is on, control for auto-focusing and control for calculation for exposure are performed (at steps #1 through #3). When the switch 'S2' is on, after taking a photograph, a film is wound up by one picture frame (at steps #4 through #5).

Figure 8:
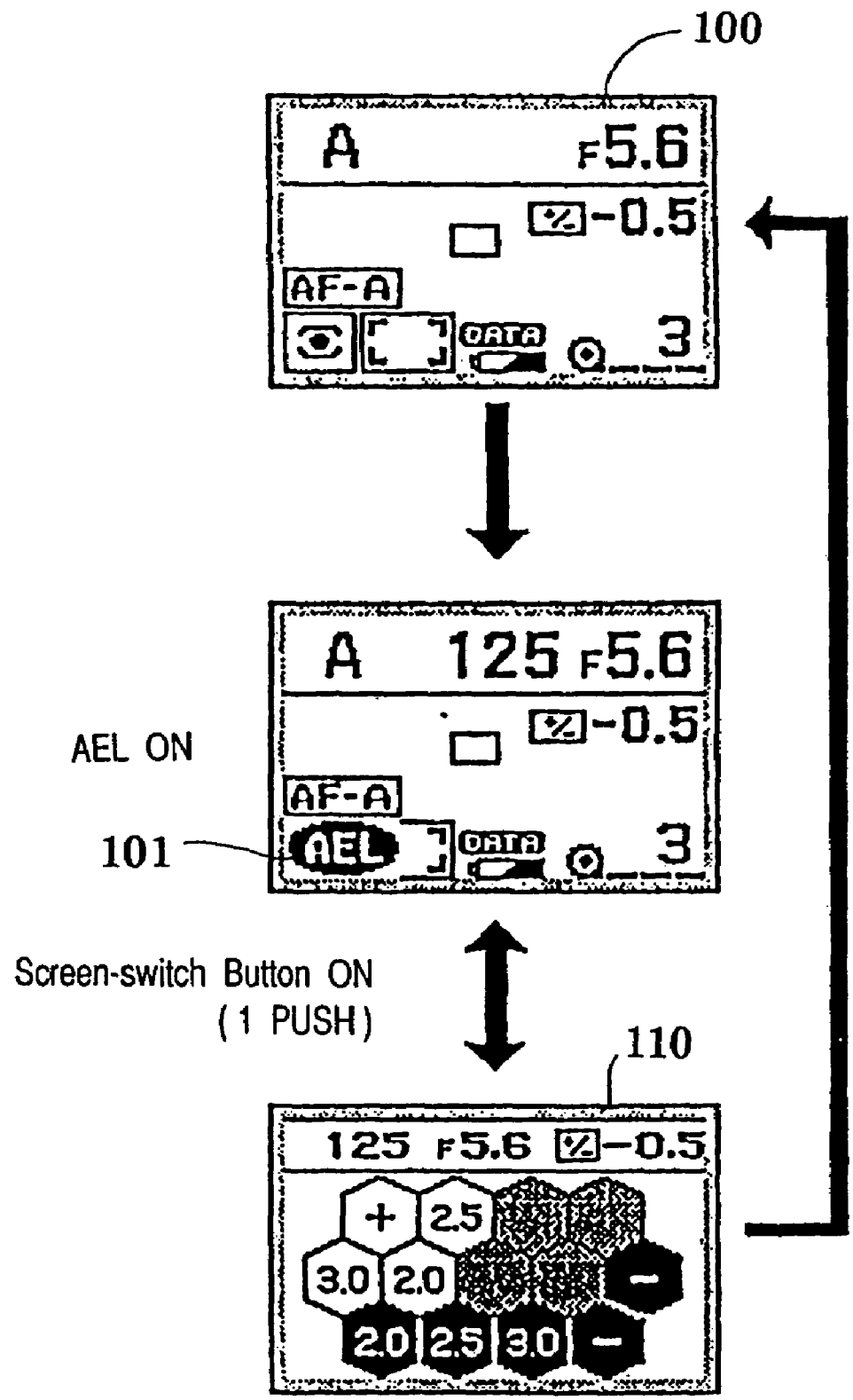
FIG. 8 is an explanatory view explaining a switchover to a brightness distribution display mode (or a display mode of brightness distribution).

At the step of #10, it is determined whether the AE-lock button 4 (button for locking the exposure value in the auto exposure function) is switched on or not. In the case of 'on', AE locking operation is performed (#11), and it is determined whether the screen-switch button 8 is switched on or not (#12). If the screen-switch button 8 is on, data for displaying a brightness distribution is prepared (#13), and it is displayed (#80). Then, the displaying mode on the LCD device 11 is switched from the main display mode to the brightness distribution display mode, both described thereafter. This changeover is shown in FIG. 8.

The screen 100 is a "detailed screen" (refer to FIG. 10) which is one of the main display modes. In this display mode, when the AE-lock button 4 is pushed, "AEL" indication 101 appears on the screen 100. When the screen-switch button 8 is pushed with the AE-lock being maintained, the screen is switched to a brightness distribution display screen 110.

Each hexagonal area in the brightness distribution display screen 110 corresponds to each detecting area of a divided photometry device, which the camera 10 is equipped with. In each hexagonal area in the brightness distribution display screen 110, brightness information in the area is indicated. In the shown embodiment, the brightness information is indicated in the hexagonal areas. But, in the hexagonal areas, there may be indicated information other than that about brightness, for example, distance information at AF (auto focus) control, and information about adjustment of flash light.

Figure 9:
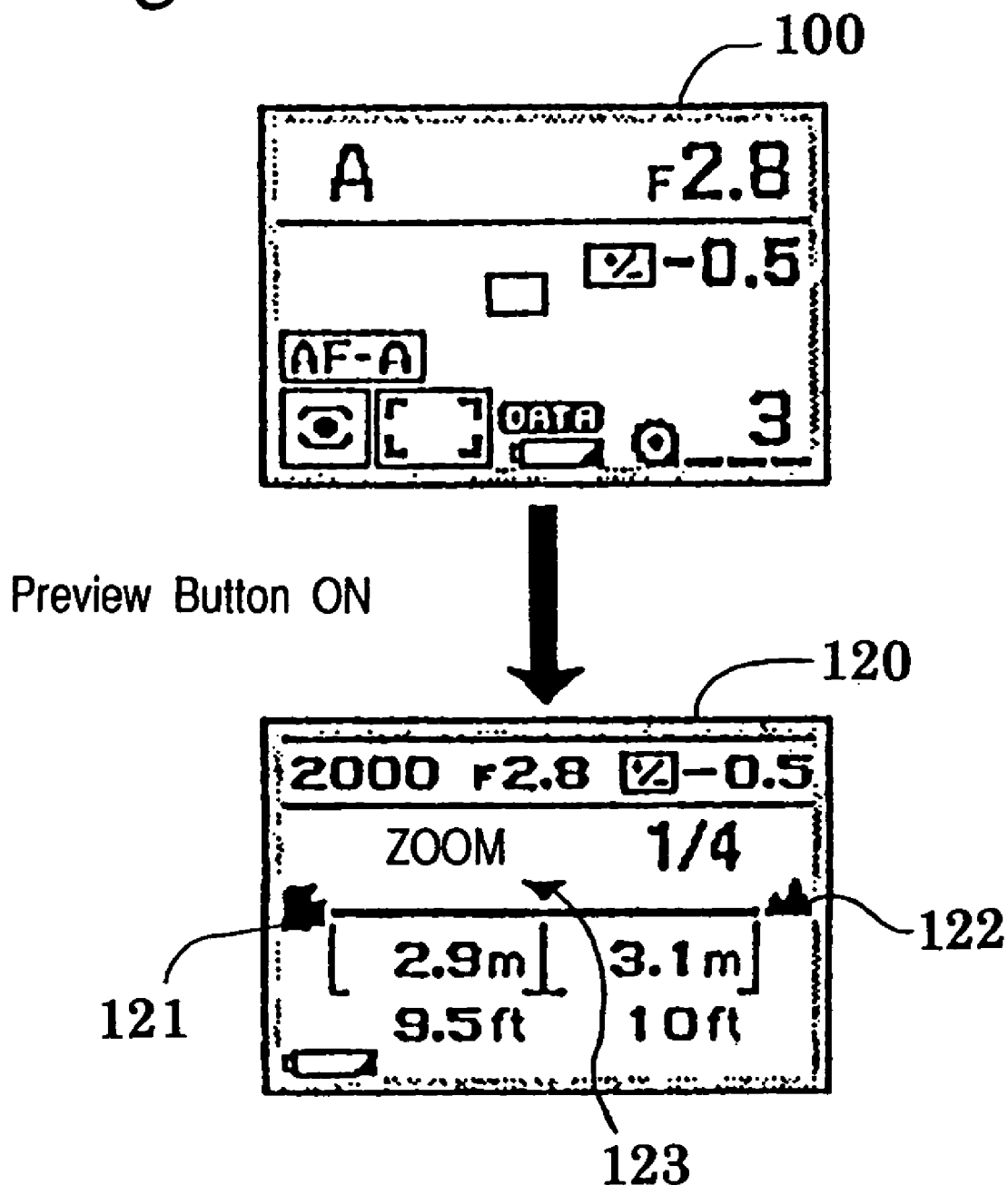
FIG. 9 is an explanatory view explaining a switchover to a depth of field display mode (or a display mode of depth of field).

At the step of #20, it is determined whether the preview button 3 is switched on or not. The preview button 3 is intended for performing actual stopping down operation up to a value which user sets up, so that the user can confirm depth of field in the photographic frame before taking a picture. If the preview button 3 is switched on, data for displaying a depth of field is prepared (#21), and it is displayed (#80). Then, the mode of the display of the LCD device 11 is switched from the main display mode to the depth of field display mode (or displaying mode of the depth of field), both described thereafter. This switchover is shown in FIG. 9.

The screen 100 is a "detailed screen" (refer to FIG. 10) which is one of the main display modes. In this display mode, when the preview button 3 is pushed, the screen is switched to a screen 120, which presents the depth of field display mode. In the screen 120, a reference numeral 121 represents an icon which indicates camera position, and a reference numeral 122 represents an icon which indicates object position. A triangular pointer 123 is an icon which indicates a position where a focus is in the optimum. The screen 120 shows that the camera can substantially focus on the photographic object in the range from 2.9 m ahead of the object (or subject) to 3.1 m back thereof.

At the step of #30, it is determined whether the screen-switch button 8 is switched on or not. The screen-switch button 8 mainly serves as a selector used for selecting one main display mode. That is, in this embodiment, there are provided "detailed screen 100", "enlarged screen 200", "photometry indicator screen 300", and "photographing history screen 400" respectively as a main display mode.

Figure 10:
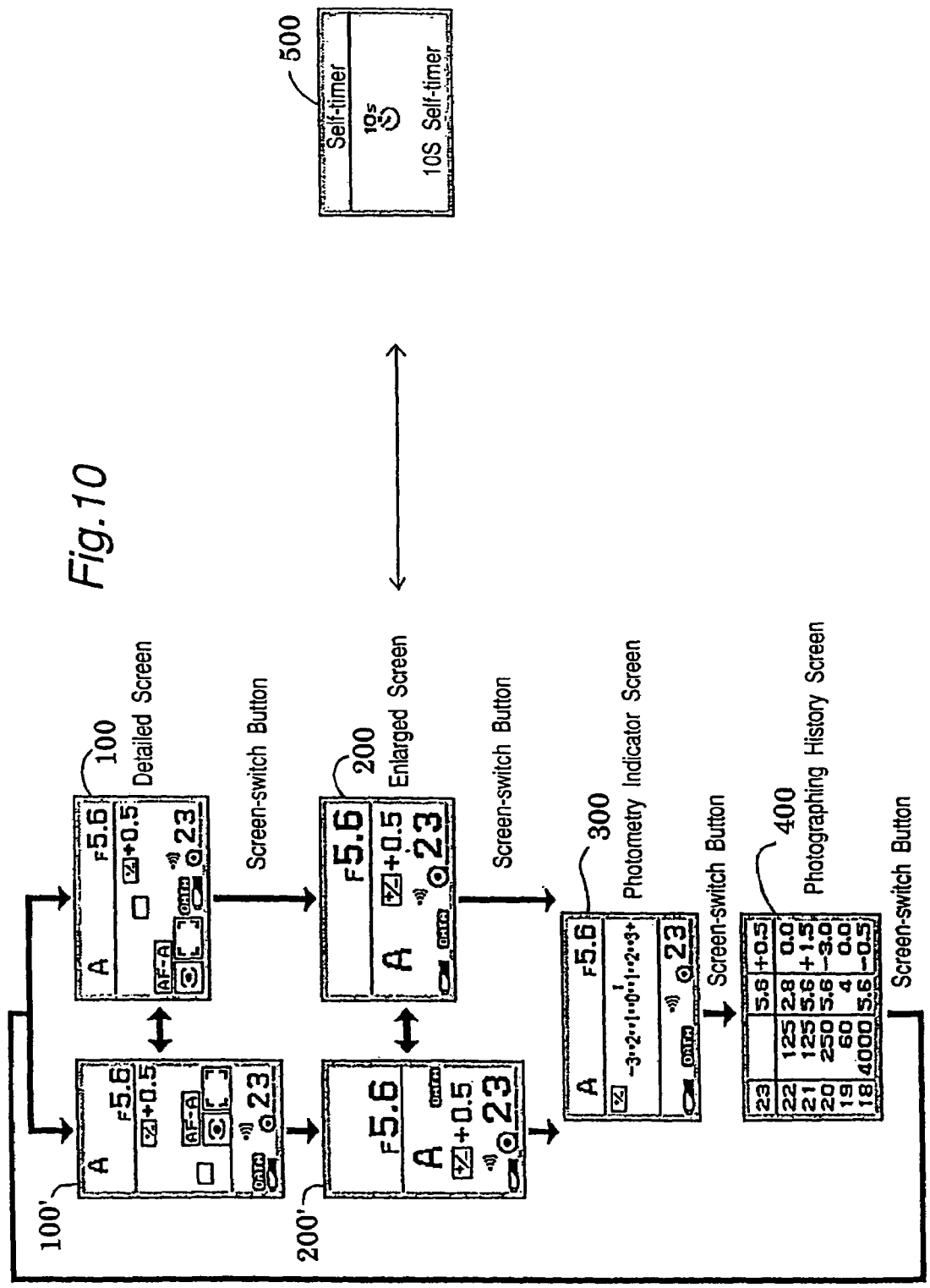
FIG. 10 is an explanatory view explaining a relationship between a main display mode and a sub-display mode.

If the screen-switch button 8 is switched on, it is determined what the current display mode is on the LCD device 11. When the "detailed screen 100" is displayed, data for displaying the "enlarged screen 200" is prepared, and it is displayed (at steps #31, #35, and #80). When the "enlarged screen 200" is displayed, data for displaying the "photometry indicator screen 300" is prepared, and it is displayed (at steps #32, #36, and #80). When the "photometry indicator screen 300" is displayed, data for displaying the "photographing history screen 400" is prepared, and it is displayed (at steps #33, #37, and # 80). When the current display mode is not any of the "detailed screen 100", the "enlarged screen 200", and the "photometry indicator screen 300", data for displaying the "detailed screen 100" is prepared, and it is displayed (at steps #34 and #80). Thus, pushing the screen-switch button 8, user can change the above-mentioned four main modes one by one. This operation is shown in FIG. 10.

The "detailed screen 100" is of a standard displaying mode, at which standard information on photographic condition is displayed. The "enlarged screen 200" is of an enlargement displaying mode, at which information of frequent use is extracted from pieces of information shown on the "detailed screen 100" and is displayed.

In the "photometry indicator screen 300", the indication of "exposure compensation value+0.5" on the "enlarged screen 200" is represented, using bar graph. As to other pieces of information, they are displayed in the same form on the both screens 200 and 300. Although the bar graph is employed in the shown embodiment, there can be also employed any suitable displaying form, such as a circle graph.

In the "photographing history screen 400", there are listed up photographic information about a plurality of picture frames (e.g. from the 18th to the 23rd frames in the drawing). On the other hand, in each of other screens 100, 200, and 300, the photographic information about a certain picture frame (the 23rd frame in the drawing) is only displayed.

At the step of #40, it is determined whether the self-timer button 5 is switched on or not. If the "enlarged screen 200" is presented with the self-timer button 5 being on, no indications about self-timer function are included in the "enlarged screen 200". Therefore, data is prepared for displaying a "self-timer screen 500" which is a sub-display mode, and it is displayed (steps of #41, #43, and #80). The "self-timer screen 500" is the screen which displays information about the self-timer function, in an enlarged form.

If the "detailed screen 100", rather than the "enlarged screen 200", is presented with the self-timer button 5 being on, information about the self-timer function is to be displayed in the "detailed screen 100". Thus, data for detailed display of the self-timer function is prepared, and it is displayed (steps of #41, #42, and #80). In the shown flow chart, at the step of #41, it is determined which is currently presented, the "detailed screen 100" or the "enlarged screen

200". Also in the case of the "photometry indicator screen 300" and the "photographing history screen 400" in FIG. 10, the like control is preferably performed, because no information about the self-timer function is included in the "photometry indicator screen 300" and the "photographing history screen 400".

Preferably, the "self-timer screen 500", which is a sub-display mode, is controlled so to be automatically returned to the main display mode which has been displayed just before the displaying of the screen 500, after a predetermined time elapses.

Figure 17:
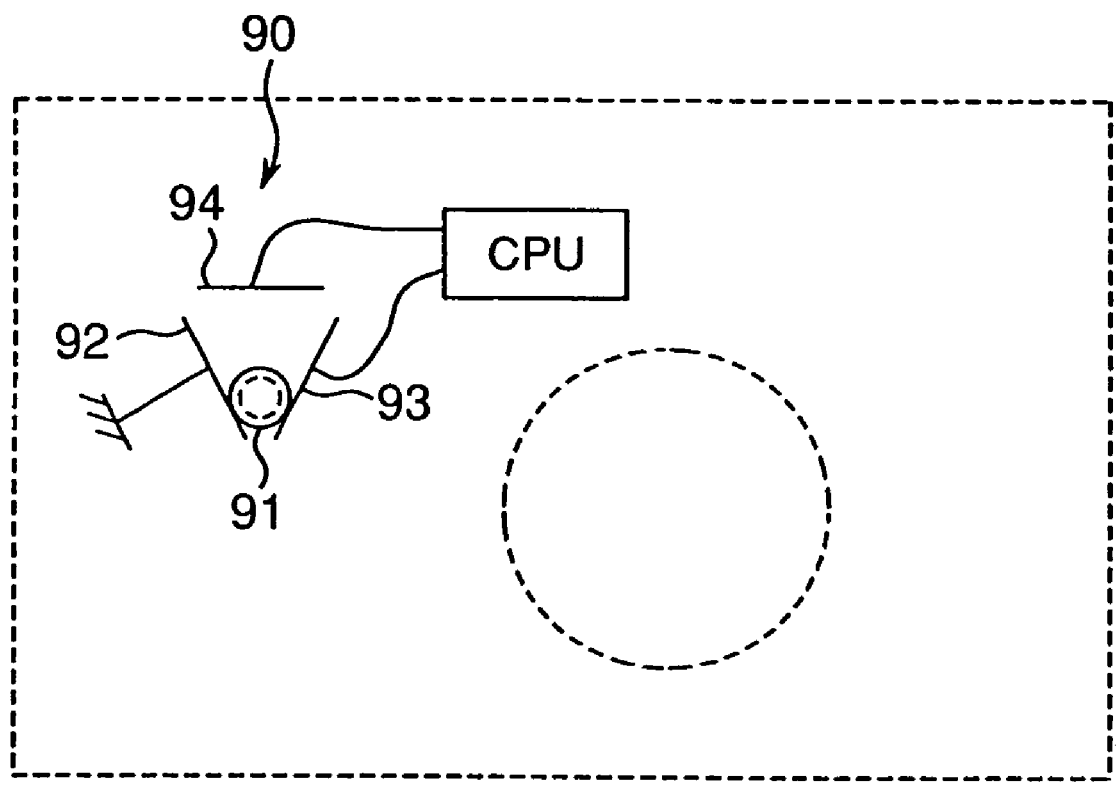
FIG. 17 is an explanatory view showing a sensor for detecting a camera posture.

At the step of #50, it is detected whether a posture of the camera body is horizontal or vertical. This detection can be conducted with such as a sensor (detector) 90 roughly shown in FIG. 17. The sensor 90 detects the posture of the camera body, utilizing a metal ball 91 and three plates 92 to 94. When the camera body postures vertically, data conversion is performed so as to change the indication on the LCD device 11 from horizontal one to vertical one, and it is displayed (steps of #51 and #80).

The "detailed screen 100" in FIG. 10 is horizontal one. When the sensor 90 detects that the camera body postures vertically, the indication on the LCD device 11 is changed to the screen 100' which is vertical one. In the same manner, the "enlarged screen 200" is also automatically changed between a horizontal one (screen 200) and a vertical one (screen 200'), based on a detection by the sensor 90. Although it is not shown in FIG. 10, the "photometry indicator screen 300" and the "photographing history screen 400" can be also changed between a horizontal one and a vertical one, in the same manner.

As to the timing of an actual change of the indication on the LCD device 11 after the detection of the camera body by the sensor 90, the actual change is preferably executed when the shutter release button 1 (this is a member which the user can manually handle) is firstly half-pressed to make the switch "S1" on (namely, when the shutter release is made ready), after the posture of the camera body is detected. This is because, if the indication is changed every after the user merely changes the camera posture, it may be troublesome on the contrary to the user.

Figure 11:
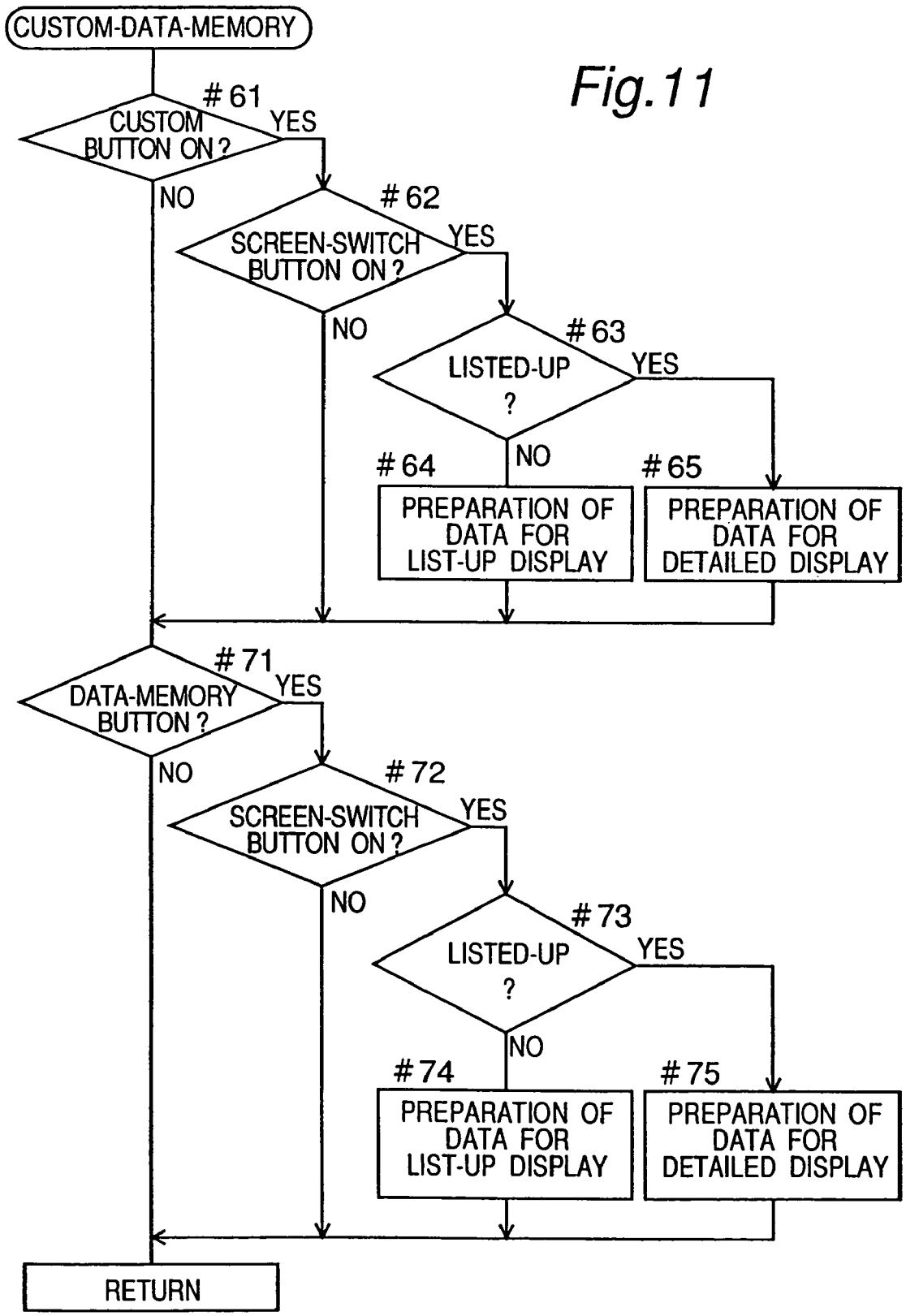
FIG. 11 shows a flow chart explaining a subroutine of custom-data-memory function.

Hereinafter, the subroutine program for custom-data-memory function is explained, with reference to FIG. 11.

At the step of #61, it is determined whether the custom button 6 is switched on or not. The camera 10 has a custom set-up function. That is, user can set up about any custom item according to his/her preference, for example, "AF-priority/release-priority" at time of photographing, "yes/no" (or with/without) automatic rewinding function, "yes/no" (or with/without) leaving a tip of the film from the cartridge at time of rewinding the film, and so on. Switching on the custom button 6, the user can set up the custom items. Actual operation for the set-up of the custom items is performed with operating the custom set-up member 9.

Figure 12:
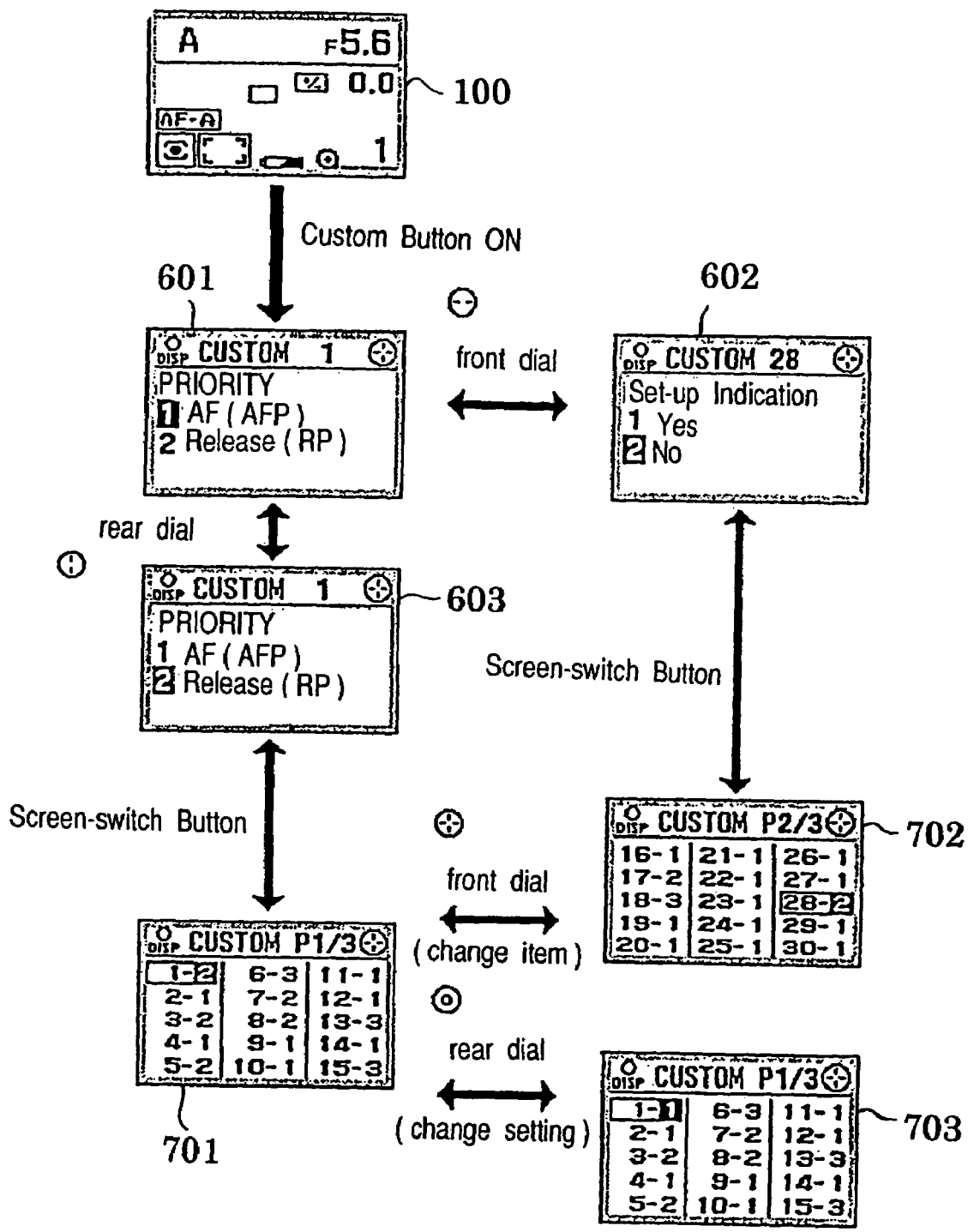
FIG. 12 is an explanatory view explaining a switchover between a list-up display form and a detailed display form, at time of performing a custom setting operation.

FIG. 12 shows the indication on the LCD device 11 at the custom set-up. The "screen 100" is one of the main display modes. The "screens 601, 602, and 603" are respectively detailed display modes, in each of which a current setting about a specific custom item is shown in detail. The "screens 701, 702, and 703" are respectively list-up display modes, in each of which current settings about a plurality of custom-made items are listed up. Switching between the detailed display modes and the list-up display modes can be performed with operating the screen-switch button 8 (selection member). In the same display mode, the switching of screens can be performed with operating the front dial 2a or the rear dial 2b.

When the custom button 6 is switched on, firstly, the list-up display mode (screen 701, 702, or 703) or the detailed display mode (screen 601, 602, or 603) is displayed on the LCD device 11, both shown in FIG. 12. Thereafter, when the screen-switch button 8 is switched on, it is determined what the current display mode on the LCD device 11 is, namely the list-up display mode or the detailed display mode (steps #62 and #63). When the list-up display mode is displayed, data for displaying the detailed display mode is prepared, and it is displayed (steps #63, #65, and #80). When the detailed display mode is displayed, data for displaying the list-up display mode is prepared, and it is displayed (steps #63, #64, and #80).

At the step of #71, it is determined whether the data-memory button 7 is switched on or not. The camera 10 has a data-memory function. That is, the camera 10 memorizes the photographic information, such as shutter speed, f-number, exposure compensation value and so on, for each picture frame in the film after photographing. The photographic information is stored in a memory portion in the microcomputer shown in FIG. 4. When the user wants to compare a finished photographic picture and the photographic information in each picture frame, the memorized photographic information can be retrieved with his/her pushing the data-memory button 7. The memorized photographic information is displayed on the LCD device 11, in the list-up display mode or the detailed display mode.

Figure 13:
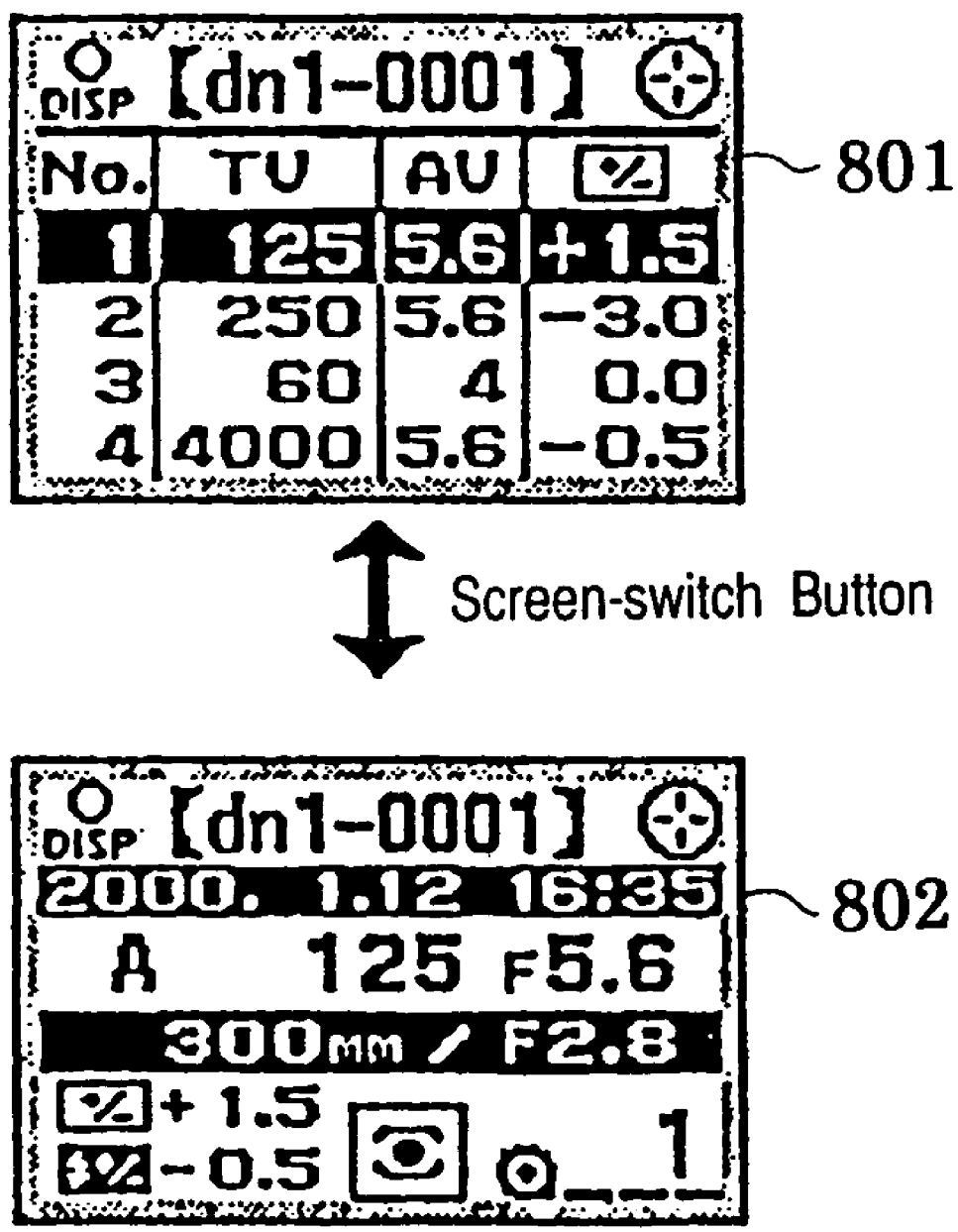
FIG. 13 is an explanatory view explaining a switchover between the list-up display form and the detailed display form, at time of calling a stored photographic information.

In the list-up display mode, the photographic information upon each picture flame is listed up. In the detailed display mode, the photographic information of a specific picture flame is shown in detail. As shown in FIG. 13, a screen 801 displaying the list-up display mode and a screen 802 displaying the detailed display mode can be switched with operating the screen-switch button 8 (selector). In FIG. 13, the detailed screen 802 displays the detailed information about the 1st picture frame, among the 1st to 4th picture frames displayed in the list-up screen 801.

When the data-memory button 7 is switched on, firstly, the list-up screen 801 or the detailed screen 802 is displayed on the LCD device 11, both shown in FIG. 13. Thereafter, when the screen-switch button 8 is switched on, it is determined what the current display mode on the LCD device 11 is, namely the list-up display mode or the detailed display mode (steps #72 and #73). When the list-up display mode is displayed, data for displaying the detailed display mode is prepared, and it is displayed (steps #73, #75, and #80). When the detailed display mode is displayed, data for displaying the list-up display mode is prepared, and it is displayed (steps #73, #74, and #80).

Figure 14:
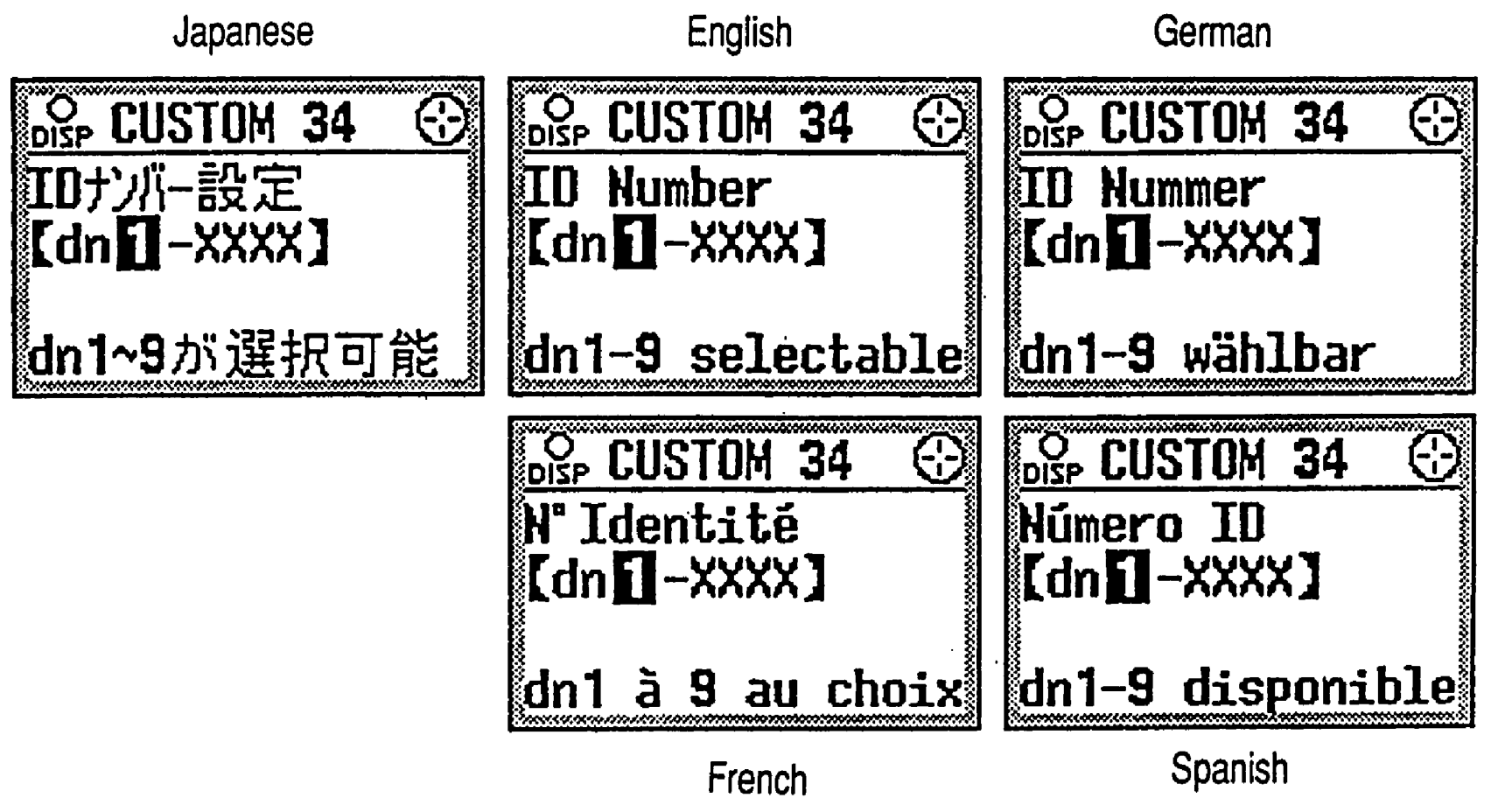
Figure 15:
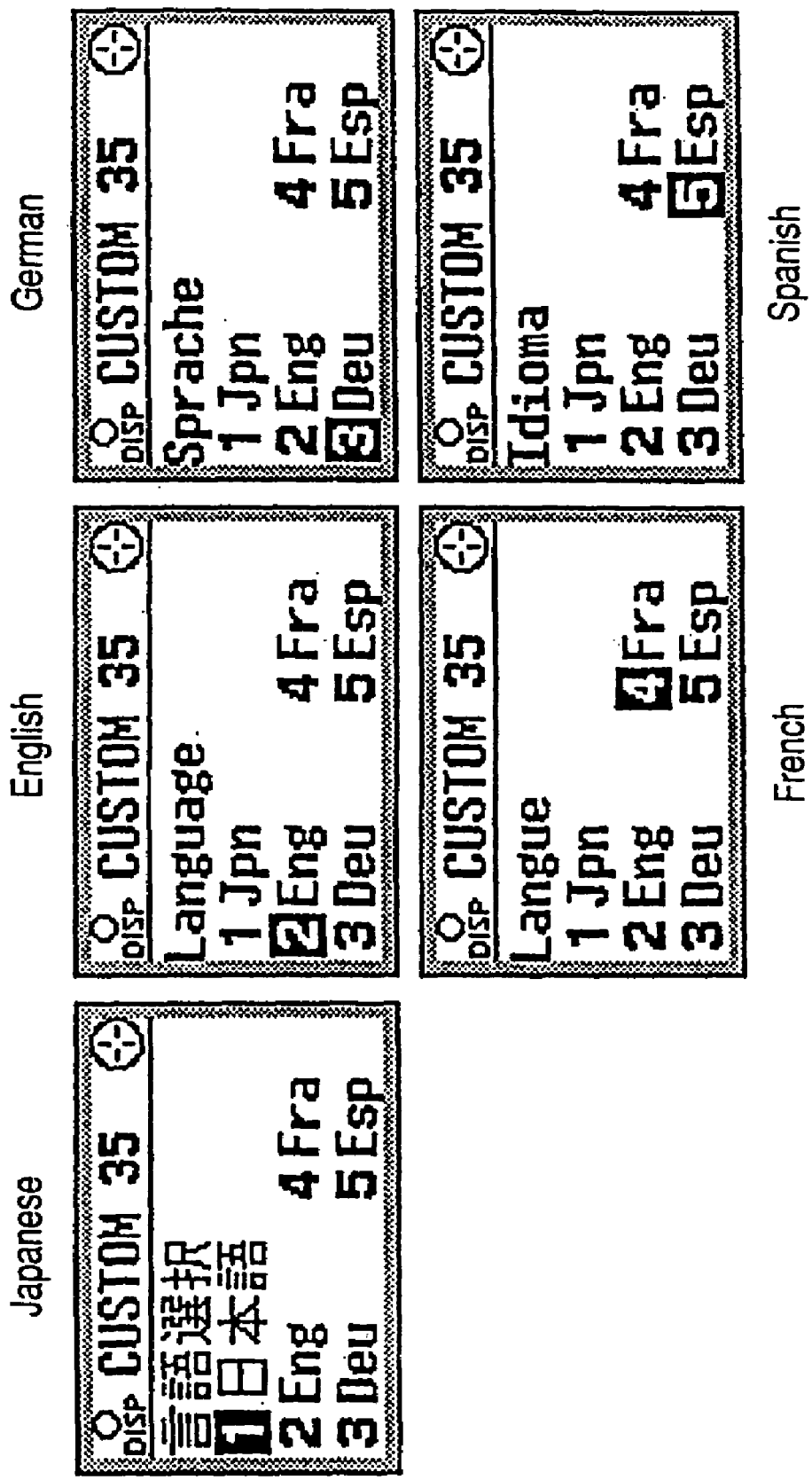
FIG. 15 is an explanatory view showing display forms in various languages.

The camera 10 has a function for switching the displaying languages. This function is explained hereinafter. For example, as shown in FIGS. 14 and 15, the same information can be displayed on LCD device 11, with different two or more languages. A maker of the camera can set up the number and kinds of languages arbitrarily. In the camera 10, five kinds of languages are employed, namely, Japanese, English, German, French, and Spanish.

Figure 16:
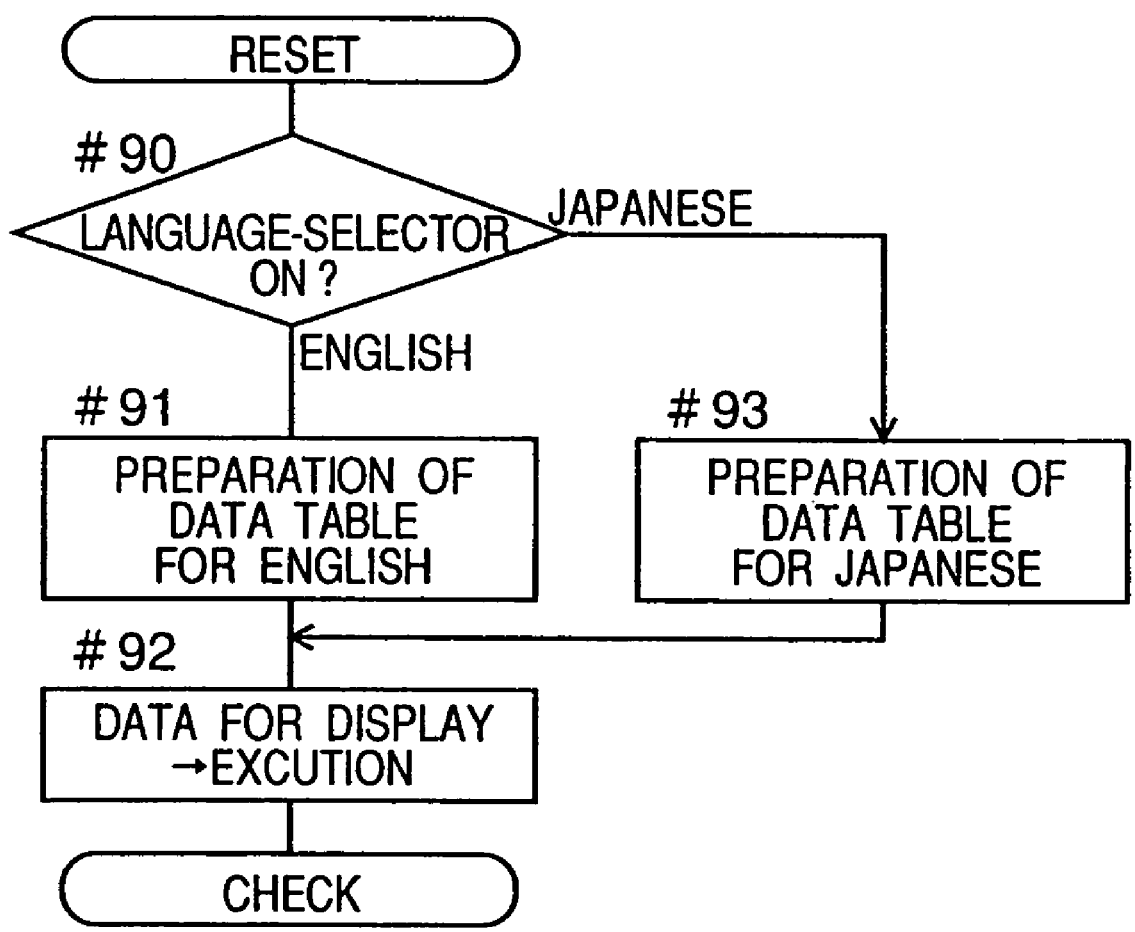
FIG. 16 shows a flow chart explaining a switchover among displaying languages.

In the embodiment shown in FIGS. 14 and 15, the kind of language can be selected as one custom item. But, it is possible to employ an operation member, such as a push button, exclusively used for switching the languages (language selector), so that the kind of language can be set up apart from custom items. The switching of the languages, in such a case, is explained below, with reference to the flow chart in FIG. 16. In the embodiment in FIG. 16, there are two languages which can be selected, Japanese and English.

At the step of #90, it is determined what language is selected by the language selection switch. If English language is selected, steps proceed to #91, and data table for displaying with English language is prepared, and it is displayed (#92). If Japanese language is selected, steps proceed to #93, and data table for displaying with Japanese language is prepared, and it is displayed (#92).

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera comprising:
a display which displays information about photographic conditions,
an operation member which can be manually operated;
a detector which detects a posture of a camera body prior to operation of the operation member, and
a controller which changes a direction, in which the information is displayed on the display, based on a posture of the camera body detected by the detector, at a time of operating the operation member.

2. The camera of claim 1, wherein when the controller changes the direction, in which the information is displayed on the display, an arrangement of the information on the display is changed.

3. The camera of claim 1, wherein the operation member is a release button to start photographing.

4. The camera of claim 3, wherein
the release button is constructed for two-stage operating, first stage of which being for ready for taking photograph, and second stage of which being for taking photograph, and
the photographing starts at the first stage of the two-stage operating.

5. The camera of claim 1, wherein the detector detects whether the camera body postures horizontally or vertically.

6. The camera of claim 5, wherein the camera has a plurality of horizontal display modes each of which is displayed on the display when the camera body postures horizontally, and a plurality of vertical display modes each of which is displayed on the display when the camera body postures vertically, the number of the horizontal display modes being same as that of the vertical display modes, and each of the horizontal display modes corresponding to each of the vertical display modes, and
when the controller changes the direction, in which the information is displayed on the display, a horizontal display mode or a vertical display mode on the display is changed to a corresponding vertical display mode or a corresponding horizontal display mode.

7. A camera comprising:
a display which displays information about photographic conditions,
an operation member which can be manually operated,
a detector which detects a posture of a camera body prior to operation of the operation member, and
a controller which makes data conversion to change displaying on the display, based on a posture of the camera body detected by the detector, at a time of operating the operation member.

8. A camera comprising:
a display which displays information about photographic conditions,
an operation member which can be manually operated,
a detector which detects a posture of a camera body prior to operation of the operation member, and
a controller which changes a data for displaying on the display, when the controller receives a signal representing that the posture of the camera is changed and a signal representing that the operation member is operated.

9. A camera comprising:
a display using a dot-matrix which displays information about photographic conditions in arbitrary display form,
an operation member which can be manually operated,
a detector which detects whether a camera body postures horizontally or vertically, prior to operation of the operation member, and
a controller which changes a direction, in which the information is displayed on the display, based on a posture of the camera body detected by the detector, at a time of operating the operation member.

10. The camera of claim 9, at time of changing the direction, an arrangement of the information about photographic conditions is changed.

11. The camera of claim 9, wherein the operation member is a release button to start photographing.

12. The camera of claim 11, wherein the release button is constructed for two-stage operating, first stage of which being for ready for taking photograph, and second stage of which being for taking photograph, and
the photographing starts at the first stage of the two-stage operating.

13. The camera of claim 9, wherein the camera has a plurality of horizontal display modes each of which is displayed on the display when the camera body postures horizontally, and a plurality of vertical display modes each of which is displayed on the display when the camera body postures vertically, the number of the horizontal display modes being same as that of the vertical display modes, and each of the horizontal display modes corresponding to each of the vertical display modes, and
when the controller changes the direction, in which the information is displayed on the display, a horizontal display mode or a vertical display mode on the display is changed to a corresponding vertical display mode or a corresponding horizontal display mode.

* * * * *